Sept. 30, 1941.　　　G. S. THOMPSON　　　2,257,659
AUTOMOBILE DIRECTION SIGNAL
Filed June 9, 1939　　　2 Sheets-Sheet 1
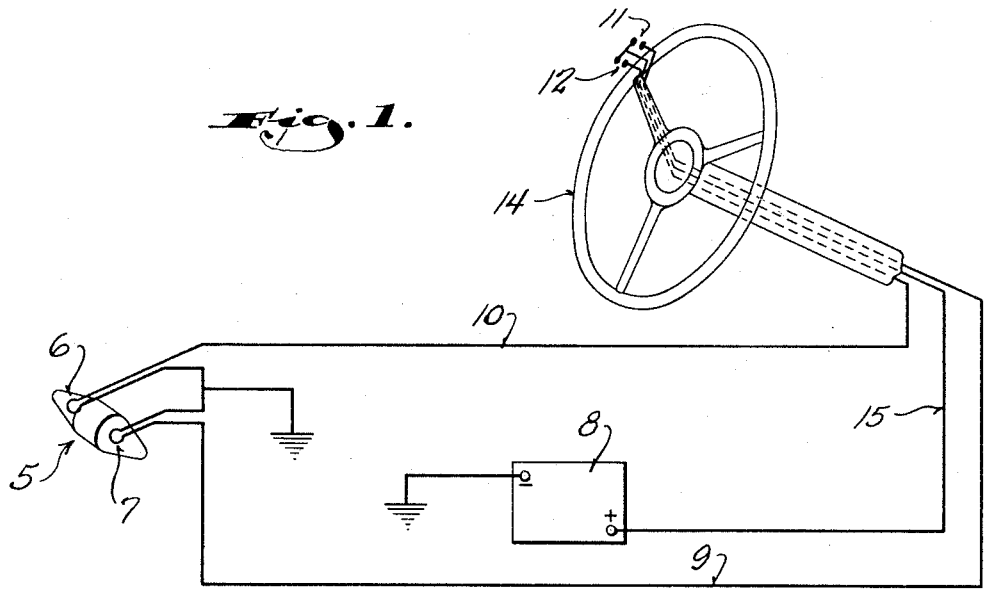
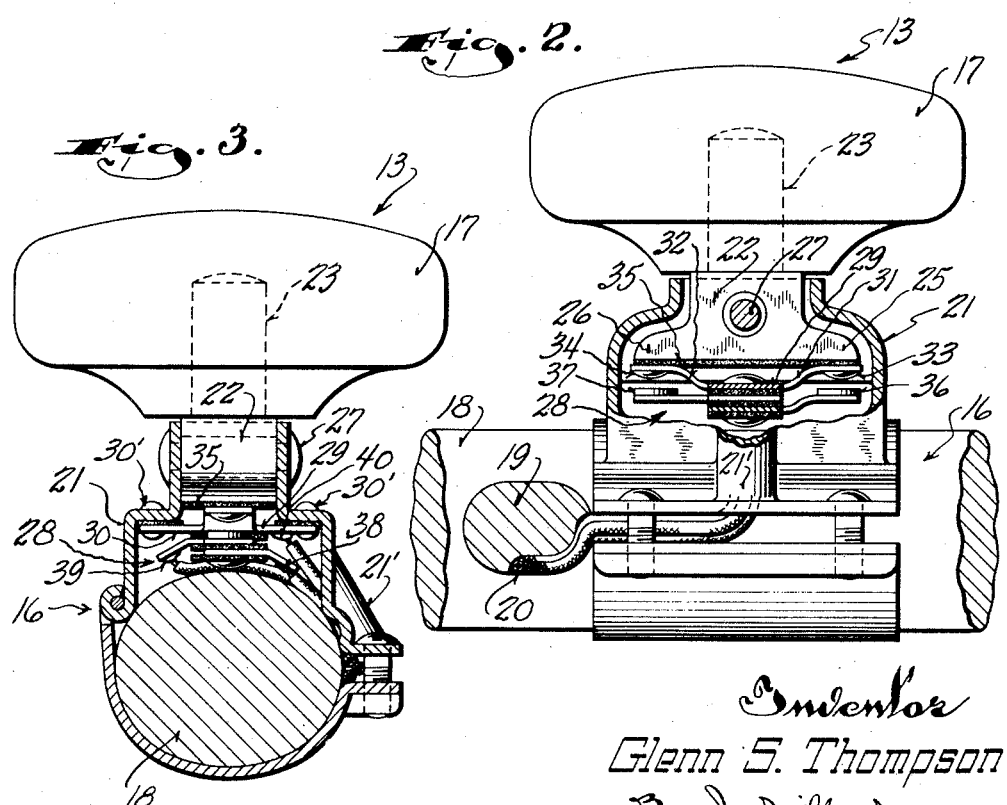
Inventor
Glenn S. Thompson Sept. 30, 1941. G. S. THOMPSON 2,257,659
AUTOMOBILE DIRECTION SIGNAL
Filed June 9, 1939 2 Sheets-Sheet 2

Inventor
Glenn S. Thompson

Patented Sept. 30, 1941

2,257,659

UNITED STATES PATENT OFFICE 2,257,659

AUTOMOBILE DIRECTION SIGNAL

Glenn S. Thompson, Milwaukee, Wis., assignor to Briggs & Stratton Corporation, Milwaukee, Wis., a corporation of Delaware Application June 9, 1939, Serial No. 278,174

19 Claims. (Cl. 200—59)

This invention relates to automobile direction signals and refers particularly to a "right" and "left" turn signal of the type disclosed in the application of Edward N. Jacobi, Serial No. 257,436, filed February 20, 1939, for Automobile direction signals.

Signals of this type are usually mounted at the rear of an automobile and comprise two electrically lighted lamps connected in electric circuits under the control of the operator of the vehicle.

Like the aforementioned application, this invention also has, as a general object, the provision of a novel and improved switch mounted on the steering wheel of the automobile and designed so that closure of the switch to effect lighting of one of the signals is accomplished without necessitating conscious effort on the part of the driver and without distracting his attention in any manner.

More specifically, it is an object of this invention to provide the steering wheel of an automobile with a control knob having switches for controlling the electric signals at the rear of the automobile built therein so that turning of the wheel by means of the control automatically signals the intended direction.

Another object is to enable the operator of a vehicle equipped with this invention to signal a turn in advance of the actual change in direction merely through the act of preparing for such a turn, at which time the hand of the operator is shifted to grasp the control knob.

A further object of this invention is to provide a direction signal system which may be installed on a vehicle as an accessory.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which:

Figure 1 is a diagrammatic view illustrating the complete signal system;

Figure 2 is a view of a portion of the steering wheel illustrating the application of the control switch thereto;

Figure 3 is a sectional view taken through Figure 2 on the plane of the line 3—3;

Figure 4:
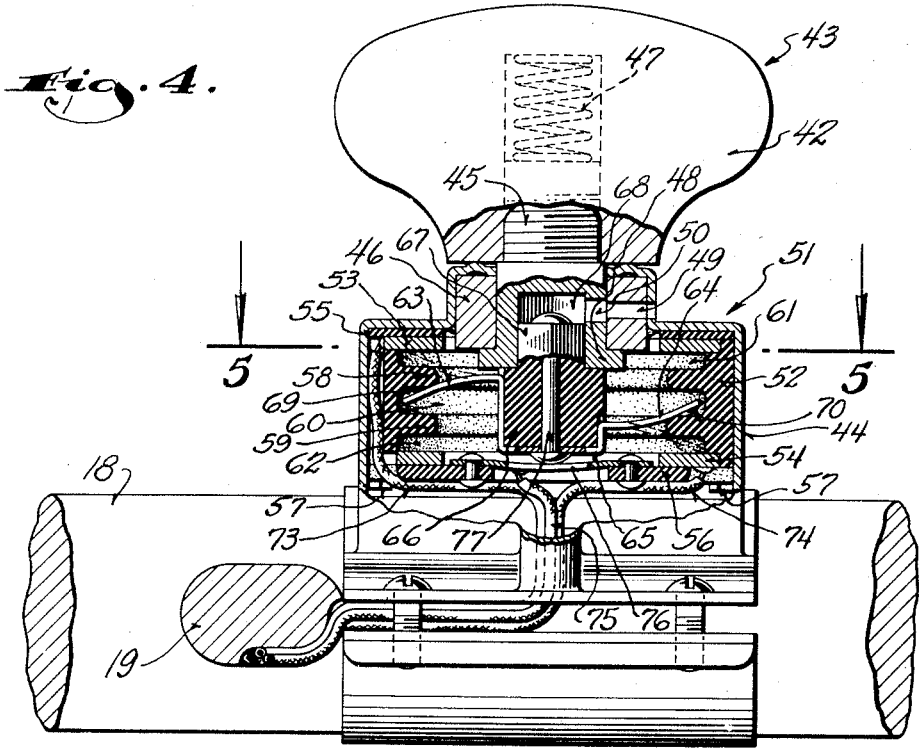
Figure 4 is a view similar to Figure 2 illustrating a modified form of control switch.

Referring now particularly to the accompanying drawings, in which like numerals indicate like parts throughout the several views, and particularly to Figure 1, the numeral 5 designates a "right" and "left" turn signal of the type attached to the rear of an automobile. The signal is rendered operative by the illumination of either of two electric lamps 6 and 7, the former being lighted to designate a "left" turn and the latter being lighted to designate a "right" turn.

The signal lamps are connected with the battery 8 of the automobile through circuits 9 and 10 upon closure of "right" and "left" switches 11 and 12, respectively, forming a part of a steering control knob 13 secured to the steering wheel 14. Upon closure of either switch 11 or 12, one of the circuits 9 or 10 is completed through a common lead 15 connected with the battery 8.

As will be hereinafter more fully described, the use of the control knob to turn the steering wheel when desired to change the direction of travel, automatically closes the circuit for the proper signal lamp and illuminates the same to signal such change.

Referring to Figure 2, it is seen that the control knob, indicated generally by the numeral 13, comprises a clamp 16 having connected thereto a knob-like handle 17 of a size to fit the hand of the operator of the vehicle. The location of the control 13 may be at any point on the steering wheel remote from its hub; but it is preferably clamped on the rim 18 adjacent to one of the spokes, or to one of the spokes 19 adjacent to its connection with the rim.

The control is thus located to facilitate concealment of the conductors of the circuits 9 and 10, in a groove 20 in the underside of the adjacent spoke. Inasmuch as the conductors lead directly into the housing 21 formed by the clamp 16, no special means of concealment is required at the rim. However, if desired, that portion of the rim embraced by the clamp may be grooved to receive the wires, or the clamp may be formed with a channel 21' to provide for the passage of the conductors from the spoke to the interior of the housing.

In the preferred embodiment of the invention illustrated in Figures 2 and 3, the handle 17 of the control has a neck 22 extending down into the housing 21. The neck 22 is substantially rectangular in cross section and has a stem 23 upon which the handle 17 is freely rotatably mounted in any suitable manner. The inner end of the neck is formed to provide oppositely extending arms 25 and 26.

At a medial point, the neck 22 is pivotally connected to the upper end of the housing by means of a pin 27 mounted in the side walls of the housing and passing through the neck. The end walls of the housing are spaced from the adjacent surfaces of the neck 22 to accommodate the arms 25 and 26 and permit the assembled handle and neck to rock or pivot about the pin 27. Such pivotal motion, however, is limited by the engagement of the arms 25 and 26 with the adjacent end walls of the housing.

The switch mechanism, indicated generally by the numeral 28, is carried by the housing directly beneath the inner end of the neck 22 and comprises a supporting member 29 stamped from spring metal and having crossed arms, one of which, designated 30, extends across the interior of the housing to be secured to but electrically insulated from its side walls, as at 30'. The other arm of this supporting member provides spring contact fingers 31 and 32 carrying contacts 33 and 34, respectively, at their extremities. These spring fingers engage the undersides of the arms 25 and 26 to yieldingly hold the neck member and the handle 17 in an intermediate position between its limits of pivotal motion.

A strip of insulating material 35, fixed to the underside of the neck member 22, insulates its arms 25 and 26 from the spring fingers 31 and 32.

Upon pivotal or rocking motion of the handle 17, one of the arms 25 or 26 depresses its respective spring finger to engage the contact thereon with one of a pair of cooperating stationary contacts 36 and 37. These stationary contacts are mounted on the outer ends of spring arms which are fixed to the underside of the supporting member 29, but electrically insulated therefrom and from each other.

The spacing between the movable contacts and the stationary contacts is such that engagement thereof is effected upon rocking of the handle before such rocking motion is limited in the manner aforesaid.

The conductor for the circuit 9 is electrically connected with the stationary contact 36, as at 38, (Figure 3) and the conductor for the circuit 10 is electrically connected to the stationary contact 37, as at 39, so that rocking motion of the handle in a counter clockwise direction to turn the steering wheel "left" engages the contact 34 with the stationary contact 37 to complete the circuit to the "left" signal 6, the common or battery lead 15 being connected electrically to the member 29, as at 40.

It is apparent, therefore, that rocking of the handle in a clockwise direction as when the steering wheel is turned "right" effects engagement of the contacts 33 and 36 to complete the circuit for the "right" signal lamp 7.

A highly important feature of this invention results from the fact that the proper signal lamp is illuminated automatically upon turning the steering wheel by means of the control 13. While this signal may be made without conscious effort on the part of the driver during the initial turning of the steering wheel to change the direction of travel, it is apparent that an equally important feature resides in the fact that such signal may be made deliberately by the operator in advance of any change in direction. In such cases, the proper signal is made merely by tilting or rocking the handle slightly in the direction in which it is desired to turn the steering wheel.

It is also to be noted that with this switch construction, it is impossible to have both signals illuminated at the same time, and further, that the danger of a signal lamp remaining illuminated after a turn is completed and the vehicle is again traveling in a straight path, is positively eliminated by the "centering" action of the spring fingers which separates the contacts whenever the control is released by the operator.

In Figure 4, a modified control and switch element is shown, which also utilizes the relative motion between the handle 42 of the control 43 and the housing forming clamp 44. In this instance, the control knob is constructed similarly to conventional types in which the handle 42 is freely rotatable with respect to the housing; and for this purpose, the handle has a stem 45 threaded into its interior and projecting therefrom to be journalled in a bearing 46 carried by the housing.

A coil spring 47 positioned between the end of the stem 45 and the bottom of the threaded hole in the handle secures the handle against rotation with respect to the stem. A flange 48 engaging the underside of the bearing 46 maintains the handle assembled with the housing; and to facilitate the assembly or replacement of the handle, a hole 49 is provided through the side of the housing and its bearing which may be aligned with a hole 50 in the stem to receive a tool (not shown) for holding the stem while the handle is threaded thereon.

The switch mechanism 51 in this embodiment comprises a ring-like band 52 of insulating material concentric to the axis of the stem. At opposite ends of the band, ring-like disc contacts 53 and 54 are provided, the upper ring 53 being insulated from the metal wall of the housing by a ring of insulation 55. The insulating band and its contact members are maintained within the housing by a ring 56 of insulating material at the bottom of the housing beneath which tangs 57, struck from the wall of the housing, are engaged.

Extending inwardly from the inner surface of the band 52 are circumferential ribs 58 and 59 which are spaced apart to form a circumferential guide track 60 at the medial portion of the band. The ribs 58 and 59 are so located, however, as to provide spaces 61 and 62 between the rib 58 and the contact member 53, and between the rib 59 and the contact member 54, respectively.

The guide track 60 provides a path of travel for the ends of radial spring arms 63 and 64 formed as part of a carrier 65. The carrier 65 is nonrotatably secured to a driver 66 of insulating material which has one end squared, as at 67, and insertible into a correspondingly shaped recess 68 in the stem 45.

Thus, it will be seen that rotation of the handle 42 is transmitted through the driver to rotate the same and move its spring arms 63 and 64 along the path 60.

The spring arms 63 and 64 are so flexed, however, as to be maintained in the path 60 under tension with the arm 63, which carries a contact 69 at its outer end, urged upwardly against the underside of the rib 58 and the arm 64, which carries a contact 70 at its outer end, urged downwardly against the top side of the rib 59.

To permit the contacts 69 and 70 to be engaged with their respective contact members 53 and 54, a plurality of openings or outlet passages 71 and 72 are provided in the ribs 58 and 59, respectively, at equispaced points around the circumference thereof. The walls of these openings are inclined in such a direction that upon clockwise rotation of the handle, as viewed in Figure 5, the spring arm 63 because of its tendency to straighten out enters the first encountered opening 71 in the upper rib 58 to be switched thereby into the space 61.

As the arm 63 passes through this opening, it rides up on the inclined lower wall 71' of the opening to be cammed thereby against its spring tension into a position engaging its contact 69 with the contact member 53. Being thus flexed out of its normal position, it follows that upon counterclockwise rotation of the handle and retraction of the arm 63, the arm enters the first encountered opening 71 to be returned to the path or track 60 by the cam action of the opposite side wall 71''.

During clockwise rotation of the handle to effect the activity of the arm 63, as described, the other arm 64 remains in the path or track 60. This follows from the fact that the inclination and disposition of the walls 72' and 72'' of the opening 72 in the rib 59 against which the arm 64 presses, because of its tendency to straighten out, prevents the passage of the arm 64 into the space 62, except when the arm 64 travels in the opposite direction.

The manner in which the arm 64 is switched from the path or track 60 into the space 62 to engage its contact 70 with the contact member 54 and the way in which it is returned into the path or track 60 is the same as that described in connection with the arm 63.

It is to be noted that continued relative rotation of the handle maintains either one or the other of the sets of contacts engaged, the shape of the recess being such as to effect disengagement of the contacts only after the handle is turned in the opposite direction.

The contact members 53 and 54 are connected with leads 73 and 74, respectively, which correspond to the two circuits for the signal lamps. The arms 63 and 64 are electrically connected with the common or battery lead 75 by means of a metal spring strip 76 secured diametrically across the central portion of the ring 56 and arranged to bear against the head of a rivet 77 which secures the contact carrier to the driver 66. The spring strip 76 thus serves to connect the contact arms with the battery and maintains the driver assembled in the housing.

With this switch construction, it is apparent that the relative rotation between the handle 42 and the housing incidental to turning of the steering wheel by means of the control effects the closure of the proper circuit to illuminate either the "right" or "left" turn lamp.

Figure 5:
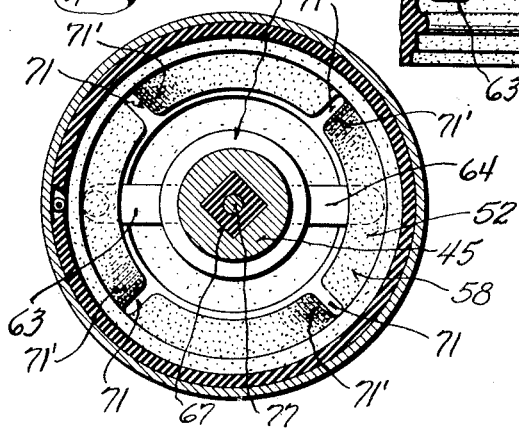
Figure 5 is a sectional view taken through Figure 4 on the plane of the line 5—5.
Figure 6:
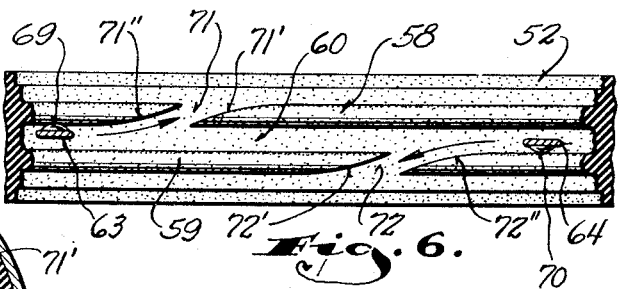
Figure 6 shows a development of a portion of the switch mechanism shown in Figure 4.

It is to be noted that during normal driving conditions, when the vehicle is traveling along a straight path, the contacts 69 and 70 are both confined in the guide track 60 at points substantially equidistant from the nearest openings in the ribs 58 and 59. It is preferable to provide four or more openings in each rib. When four openings are provided, as shown in Figure 5, a signal will be made upon relative rotation between the handle and its clamp during approximately the first one-eighth revolution of the steering wheel.

If desired, the operator of the vehicle may signal a turn in advance by deliberately rotating the handle of the control before applying turning force to the steering wheel.

From the foregoing description taken in connection with the accompanying drawings, it will be readily apparent to those skilled in the art that this invention provides an exceedingly simple and improved direction signal system for automobiles and that the manner in which the switches controlling the circuits to the signals are mounted and operated enables substantially automatic signalling by eliminating the necessity for conscious effort on the part of the driver.

What I claim as my invention is:

1. A control for steering wheels comprising: a clamp adapted to be rigidly secured to a steering wheel and forming a housing; a handle portion for the control; means mounting the handle on said housing for unlimited rotation in either direction with respect thereto so that relative motion between the handle and the steering wheel is produced incidental to turning of the wheel by means of the control; switch mechanism inside said housing, said switch mechanism comprising a ring-like band of insulating material having a circumferential guide track on its inner surface substantially concentric to the axis of rotation of the handle; disc-like contact members disposed on opposite sides of said guide track; a contact carrier having a pair of radially extending spring arms, each carrying a contact at its outer end, the contact ends of said arms being normally confined in said guide track out of engagement with said disc-like contact members and yieldingly urged by the tension of their spring arms toward opposite contact members; a driving connection between the handle and the contact carrier for moving said spring arm carried contacts around the guide track; and means on said guide track at predetermined positions along the circumference thereof cooperating with said spring arms to effect engagement of the movable contacts with the disc-like contact members during movement of the movable contacts around said guide track, said means being so arranged that engagement of one of said spring arm carried contacts is effected with one of said disc-like contacts to close a circuit during relative rotation of the handle in one direction and so that relative rotation of the handle in the opposite direction effects engagement of the other spring arm carried contact with the other disc-like contact member to close another circuit.

2. A control for steering wheels comprising: a clamp for securing the control to the steering wheel; a handle movably mounted on the clamp for motion relative thereto in a plane at an angle to the plane of motion of the wheel; two switches housed in said clamp and arranged to be actuated selectively according to the direction of motion of the handle, said switches including a spring contactor disposed to be moved substantially perpendicularly to the plane of the steering wheel by relative motion of the handle with respect to the clamp into contact with either of the two stationary contacts.

3. In an automotive vehicle having a steering wheel: a manually operable controller by which the steering wheel is turned, said controller having a clamp portion for securing the same to the steering wheel and having a handle portion; means mounting the handle portion on said clamp portion for relative motion with respect thereto, said mounting means preventing shifting of the handle portion relative to the steering wheel in the plane thereof whereby the handle portion is drivingly connected with the steering wheel; a pair of switches associated with said controller, one of said switches being operated upon relative motion between the controller handle and the clamp portion produced in consequence to turning of the steering wheel by the handle portion in one direction, and the other of said switches being operated upon relative motion between the controller handle and the clamp portion produced in consequence to turning of the steering wheel by the handle portion in the opposite direction.

4. In an automotive vehicle having a steering wheel: a manually operable controller by which the steering wheel is turned, said controller having a clamp portion for securing the same to the steering wheel and having a handle portion; means for movably mounting the handle portion on the clamp portion so that turning of the steering wheel by the handle portion produces motion of the handle portion relative to the clamp portion, said mounting means preventing shifting of the handle portion relative to the steering wheel in the plane thereof; a pair of switches associated with said controller; and means on one of said portions adapted to actuate one of said switches upon relative motion between the handle portion and the clamp portion produced in consequence of turning of the steering wheel by the handle portion in one direction, and for actuating the other of said switches upon relative motion between the controller handle and the clamp portion produced in consequence to turning of the steering wheel by the handle portion in the opposite direction.

5. In an automotive vehicle having a steering wheel: a manually operable controller by which the steering wheel is turned, said controller having a clamp portion for securing the same to the steering wheel and having a handle portion; means for movable mounting the handle portion on the clamp portion so that turning of the steering wheel by the handle portion produces motion of the handle portion relative to the clamp portion, said means preventing shifting of the handle portion relative to the steering wheel in the plane of the steering wheel, and including a pivot for the handle portion providing for unlimited rotation thereof on an axis angular with respect to said plane; a pair of switches associated with said controller; and means on the handle portion adapted to actuate one of said switches upon relative motion between the handle portion and the clamp portion produced in consequence to turning of the steering wheel by the handle portion in one direction, and for actuating the other of said switches upon relative motion between the controller handle and the clamp portion produced in consequence to turning of the steering wheel by the handle portion in the opposite direction.

6. In an automotive vehicle having a steering wheel: a manual controller by which the steering wheel is turned, said controller having a clamp portion for securing the same to the steering wheel and having a handle portion pivotally carried by the clamp portion so as to permit relative motion between the handle and the clamp portion upon turning the wheel by means of the controller; means on the clamp for drivingly connecting the pivoted handle with the steering wheel so as to preclude circumferential shifting between the handle and the wheel; and switches carried by said controller, one of said switches being actuated upon relative motion between the controller handle and the clamp portion produced in consequence to turning of the steering wheel by the handle portion in one direction and another of said switches being actuated upon relative motion between the controller handle and the clamp portion produced in consequence to turning of the steering wheel by the handle portion in the opposite direction.

7. In an automotive vehicle having a steering wheel: a manually operable controller by which the steering wheel is turned, said controller comprising a clamp portion for securing the same to the steering wheel and a handle portion pivotally carried by the clamp so as to permit relative motion between the handle and the clamp upon such turning of the wheel; means on the clamp engaged with the handle portion for drivingly connecting the handle with the steering wheel so as to prevent circumferential displacement of the handle with respect to the wheel; a pair of switches carried by the controller adjacent to the controller handle; and means on one of said portions engageable with the movable contacts of said switches and adapted to close one of said switches upon relative motion between the handle and the clamp portion produced in consequence to turning of the steering wheel in one direction, the other of said switches being closed upon relative motion between the controller handle and the clamp portion produced in consequence to turning of the steering wheel in the opposite direction.

8. A control for facilitating turning of the steering wheel of an automobile comprising: a knob, and a clamp for securing the knob to a portion of the steering wheel, said clamp forming a housing; means mounting said knob on the clamp for relative movement with respect thereto, such movement comprising unrestricted rotation of the knob in either of two directions, said mounting means preventing circumferential shifting of the knob relative to the steering wheel; and switch mechanism within said housing formed by the clamp, the movable contactor of which is actuated by a part of said knob to effect closing of a circuit during relative motion between the knob and the clamp produced in consequence to turning of the steering wheel by the knob in one direction.

9. A control for steering wheels comprising: a mounting member adapted to be secured to the steering wheel; a handle member; means connecting the handle member with the mounting member, said means permitting relative motion between the handle member and mounting member while preventing circumferential displacement of the handle member with respect to the steering wheel whereby the handle member is at all times positively drivingly connected with the steering wheel; an electric switch embodied in the control; and means operable upon relative motion between said members for actuating the switch.

10. A control for steering wheels comprising: a housing-like clamp for securing the control in place on the steering wheel; a handle portion carried by said clamp for pivotal motion between defined limits in a plane angular to the plane of the steering wheel; a stationary electrical contact within said housing-like clamp; and a resilient movable contactor engaged with said handle portion to normally maintain the same in an intermediate position between the extremes of its pivotal motion, said movable contactor being normally spaced from the stationary contact so that pivotal motion of the handle in one direction carries the movable contactor into engagement with said stationary contact to close an electric circuit.

11. A control for a steering wheel comprising: a housing-like clamp for securing the control in place on the steering wheel; a handle pivotally carried by said clamp in a manner enabling pivotal motion of the handle in a plane angular to the plane of the steering wheel during turning of the wheel by the handle while preventing circumferential shifting of the handle portion relative to the steering wheel; resilient means for normally maintaining the handle portion in an intermediate neutral position from which it may be swung in opposite directions; spaced stationary and movable contacts within said housing-like clamp; and a connection between the handle portion and the movable contact whereby swinging motion of the handle portion in one direction effects engagement of the contacts.

12. A control for steering wheels comprising: a clamp adapted to be rigidly secured to the steering wheel; a stem carried by said clamp for pivotal motion in a plane angular to the plane of the steering wheel, said stem having an end portion extending from the clamp; a knob-like handle freely rotatable on said end portion of the stem and by which the steering wheel is conveniently turned; and switch mechanism carried by said clamp and adapted to be actuated by the stem upon pivotal motion thereof produced in consequence to turning of the steering wheel by the knob-like handle.

13. A control for steering wheels comprising: a clamp adapted to be rigidly secured to the steering wheel; a handle for the control; means on the clamp for drivingly connecting the handle with the steering wheel so as to prevent circumferential shifting of the handle with respect to the steering wheel, said means comprising a pivotal connection between the clamp and handle; a spring arm carried by the clamp and engageable with the handle for yieldingly maintaining the handle in a predetermined position; and a plurality of sets of stationary and movable contacts housed by the clamp in insulated relationship with respect to the clamp and the handle, said contacts being arranged so that pivotal movements of the handle in one direction effects engagement of one set of contacts while pivotal movement of the handle in the opposite direction effects engagement of another set of contacts.

14. In a control device of the character described: a handle; a mounting member adapted to be secured to the steering wheel of an automotive vehicle; means connecting the handle with the mounting member in a manner providing for unlimited rotation of the handle in either direction with respect to the mounting member; stationary and movable contacts; means for translating rotation of said handle in one direction relative to said mounting member and the stationary contact into switch closing motion of the movable contact; and means for maintaining the movable contact in switch closing position upon continuous rotation of the handle in said direction relative to said mounting member and the stationary contact.

15. In a control device of the character described: a handle; a support for the handle adapted to be secured to the steering wheel of an automotive vehicle; means mounting the handle for unlimited rotation on its support in either direction with respect thereto; stationary and movable contacts; means for translating rotation of said handle relative to said support and the stationary contact into switch closing motion of the movable contact; and means for maintaining the movable contact in switch closing position upon continuous rotation of the handle in the same direction relative to said support and the stationary contact, said last named means being operable to disengage said movable contact and effect opening of its switch at the start of retrograde rotation of the handle.

16. In a spinner type control for steering wheels: a member adapted to be secured to the steering wheel; a handle pivotally connected with said member for swinging motion in a plane substantially perpendicular to the plane of the steering wheel, said pivotal connection preventing circumferential shifting of the handle with respect to the wheel while enabling the handle to swing in one direction by the application of force thereon to turn the wheel one way, and to swing in the opposite direction by the application of force thereon to turn the wheel the other way; two separate stationary contacts; unitary resilient means for yieldingly holding the handle in a "neutral" position and for engaging one of said stationary contacts upon swinging movement of the handle with relation to said member in one direction and for engaging the other of said stationary contacts upon opposite swinging movement of the handle with relation to said member.

17. A control for steering wheels comprising: a clamp adapted to be rigidly secured to a steering wheel and forming a housing; a handle for the control; means mounting the handle on the housing for unlimited rotation in either direction on an axis fixed with respect to the housing and consequently the wheel so that rotation of the handle relative to the housing is produced in consequence to turning of the wheel by means of the handle; switch contacts attached to the handle and to the housing and adapted to be closed by rotation of the handle with respect to the housing; means for holding said contacts closed as long as relative rotation continues in the same direction; and means for opening said contacts upon reversal of the direction of rotation of the handle relative to the housing.

18. A control for steering wheels comprising: a clamp adapted to be secured to the wheel and forming a housing; a handle; a pin journalled in the housing to extend substantially radially of the axis of rotation of the wheel, said pin mounting the handle for tilting motion with respect to the housing in a plane substantially perpendicular to the plane of the wheel, such tilting motion of the handle being effected during turning of the wheel by means of the handle; switch contacts in the housing adapted to be closed by tilting motion of the handle; and resilient means for separating said contacts when the handle is released.

19. A control for steering wheels comprising: a clamp adapted to be secured to the wheel and forming a housing; a handle; a pin on the housing extending substantially radially of the axis of rotation of the wheel and on which the handle is pivotally supported; cooperating stationary and movable switch contacts enclosed within the housing, the movable contacts being operatively associated with the handle so that relative pivotal motion of the handle in the housing in either direction engages one of the movable contacts with its cooperating stationary contact; and conjugate spring means for holding the handle in an intermediate neutral position with respect to the contacts when the handle is released.

GLENN S. THOMPSON.